(12) United States Patent
Ravoni et al.

(10) Patent No.: US 11,506,264 B2
(45) Date of Patent: Nov. 22, 2022

(54) SENSORIZED TENSIONER

(71) Applicant: DAYCO EUROPE S.R.L., Chieti (IT)

(72) Inventors: Marco Ravoni, Chieti (IT); Federico Licata, Pecetto Torinese (IT); Gianluca Cariccia, Turin (IT)

( * ) Notice: Subject to any disclaimer, the term of this patent is extended or adjusted under 35 U.S.C. 154(b) by 753 days.

(21) Appl. No.: 16/472,083

(22) PCT Filed: Dec. 21, 2017

(86) PCT No.: PCT/IB2017/058283
§ 371 (c)(1),
(2) Date: Jun. 20, 2019

(87) PCT Pub. No.: WO2018/116237
PCT Pub. Date: Jun. 28, 2018

(65) Prior Publication Data
US 2020/0088272 A1    Mar. 19, 2020

(30) Foreign Application Priority Data

Dec. 22, 2016   (IT) .................... IT102016000130235

(51) Int. Cl.
*F16H 7/12* (2006.01)
*F16H 7/08* (2006.01)

(52) U.S. Cl.
CPC ..... *F16H 7/1209* (2013.01); *F16H 2007/081* (2013.01); *F16H 2007/0861* (2013.01); *F16H 2007/0865* (2013.01); *F16H 2007/0882* (2013.01); *F16H 2007/0893* (2013.01)

(58) Field of Classification Search
CPC ............. F16H 2007/081; F16H 7/1281; F16H 2007/0893; F16H 2007/0861

USPC .................................................. 474/133, 135
See application file for complete search history.

(56) References Cited

U.S. PATENT DOCUMENTS

| 4,627,228 A | * | 12/1986 | Wolf | D01H 7/2216 57/88 |
| 4,854,922 A | * | 8/1989 | Hertrich | F16H 7/08 474/110 |
| 4,902,268 A | * | 2/1990 | Hertrich | F16H 7/1281 474/135 |

(Continued)

FOREIGN PATENT DOCUMENTS

| EP | 1158287 A2 | 11/2001 |
| EP | 1444452 A1 | 8/2004 |

(Continued)

OTHER PUBLICATIONS

PCT, International Search Report, International Application No. PCT/IB2017/058283 (dated Mar. 19, 2018).

(Continued)

*Primary Examiner* — Henry Y Liu
(74) *Attorney, Agent, or Firm* — FisherBroyles, LLP; Susan M. Oiler (57) ABSTRACT

A tensioner that has a base adapted to be secured to an engine, and at least one arm hinged to a pin fixed to the base and bearing a pulley adapted to cooperate with a belt of a transmission of the engine, and elastic means for pushing the at least one arm in a direction so as to keep the pulley against the belt. The tensioner has sensor means for acquiring in real time a plurality of data relating to the tensioner to estimate the state of efficiency of the same.

12 Claims, 6 Drawing Sheets

(56) References Cited

U.S. PATENT DOCUMENTS

| | | | | |
|---|---|---|---|---|
| 5,439,420 A * | 8/1995 | Meckstroth | ........... | F16H 7/1236 474/133 |
| 5,632,698 A * | 5/1997 | Suzuki | .................. | F16H 7/0848 474/135 |
| 5,752,891 A * | 5/1998 | Meckstroth | ........... | F16H 7/1209 474/135 |
| 6,165,091 A * | 12/2000 | Dinca | .................. | F16H 7/1236 474/138 |
| 6,364,044 B1 * | 4/2002 | Juan | ......................... | B62M 6/45 474/135 |
| 6,478,701 B1 * | 11/2002 | Yasuhara | .................. | F16H 7/12 474/135 |
| 6,666,784 B1 * | 12/2003 | Iwamoto | .................. | F01L 9/20 137/554 |
| 6,834,631 B1 * | 12/2004 | Blackburn | .......... | F02N 11/0848 474/135 |
| 7,226,377 B2 * | 6/2007 | Kraus | .................. | F16H 7/1209 474/135 |
| 7,354,363 B2 * | 4/2008 | Foster | .................. | F16H 7/1236 474/135 |
| 2003/0083803 A1 * | 5/2003 | Serkh | ........................ | F16H 7/14 123/195 A |
| 2003/0216205 A1 * | 11/2003 | Meckstroth | ........... | F16H 7/1227 474/135 |
| 2004/0102272 A1 * | 5/2004 | Calfa | .................... | F16H 7/1281 474/135 |
| 2004/0227400 A1 * | 11/2004 | Kraus | .................. | F16H 7/1209 305/143 |
| 2005/0012447 A1 * | 1/2005 | Komatsu | ............ | C09K 11/7789 313/503 |
| 2005/0124447 A1 * | 6/2005 | Message | ............... | F16H 7/1281 474/135 |
| 2005/0148420 A1 * | 7/2005 | Murao | .................. | F16H 7/1281 474/135 |
| 2005/0192142 A1 * | 9/2005 | Stone | ..................... | F01L 1/024 474/112 |
| 2005/0282668 A1 * | 12/2005 | Ali | ........................ | F16H 7/1281 474/101 |
| 2006/0240922 A1 * | 10/2006 | Pendergrass | .......... | F16H 7/1281 474/102 |
| 2007/0281813 A1 * | 12/2007 | Schwarz | ............... | F16H 7/1281 474/133 |
| 2009/0131208 A1 * | 5/2009 | Hawryluck | ........... | F16H 7/1281 474/135 |
| 2011/0312454 A1 * | 12/2011 | Comsa | .................... | F01L 1/024 474/135 |
| 2013/0172137 A1 * | 7/2013 | Antchak | ............... | F16H 7/1281 474/133 |
| 2014/0309882 A1 * | 10/2014 | Antchak | .................. | F02B 67/06 474/104 |
| 2015/0057117 A1 * | 2/2015 | Antchak | .................... | F16H 7/12 474/109 |
| 2015/0247559 A1 * | 9/2015 | Graves | ..................... | F16F 3/04 474/117 |

FOREIGN PATENT DOCUMENTS

| | | |
|---|---|---|
| JP | 4039785 | 1/2008 |
| WO | 2013/003937 A1 | 1/2013 |

OTHER PUBLICATIONS

PCT, Written Opinion, International Application No. PCT/IB2017/058283 (dated Mar. 19, 2018).

EP, Office Action, EP Application No. 17832349.9 (dated Mar. 9, 2021).

\* cited by examiner

SENSORIZED TENSIONER

CROSS-REFERENCE TO RELATED APPLICATIONS

The present invention is filed under 35 U.S.C. § 371 as the U.S. national phase of International Patent Application No. PCT/IB2017/058283, filed Dec. 21, 2019, which designated the United States and which claims the benefit of Italian Patent Application No. 102016000130235 filed on Dec. 22, 2016, the disclosure of which is incorporated by reference in its entirety including all tables, figures, and claims.

TECHNICAL FIELD

The present invention concerns a tensioner for a belt transmission of a motor vehicle.

BACKGROUND ART

The performance of a tensioner depends on the value of a plurality of parameters that vary over time with use of the tensioner. Said parameters are, for example, wear in the coupling between the pin and the bushing of the tensioner, the damping provided by the tensioner, or the parallelism of the tensioner arm with respect to the surface of the engine on which the tensioner is mounted.

Although said parameters can be easily measured on a test bench, it is not possible to measure the state of efficiency of the commonly used tensioners during operation. This means that unexpected breakages or malfunctions can occur.

DISCLOSURE OF INVENTION

The object of the present invention is to obtain a tensioner that allows estimation of the efficiency thereof in real time.

The above-mentioned object is achieved by a tensioner that has a base adapted to be secured to an engine, an arm hinged to a pin fixed to the base and carrying a pulley in cooperation with a belt of a transmission of the engine, and a spring for biasing the arm in a direction that keeps the pulley against the belt. The tensioner has a sensor that acquires in real time a plurality of data relating to the tensioner to estimate the state of efficiency of the same.

BRIEF DESCRIPTION OF THE DRAWINGS

For a better understanding of the present invention, a preferred embodiment is described below by way of non-limiting example and with reference to the attached drawings in which.

BEST MODE FOR CARRYING OUT THE INVENTION

Figure 1:
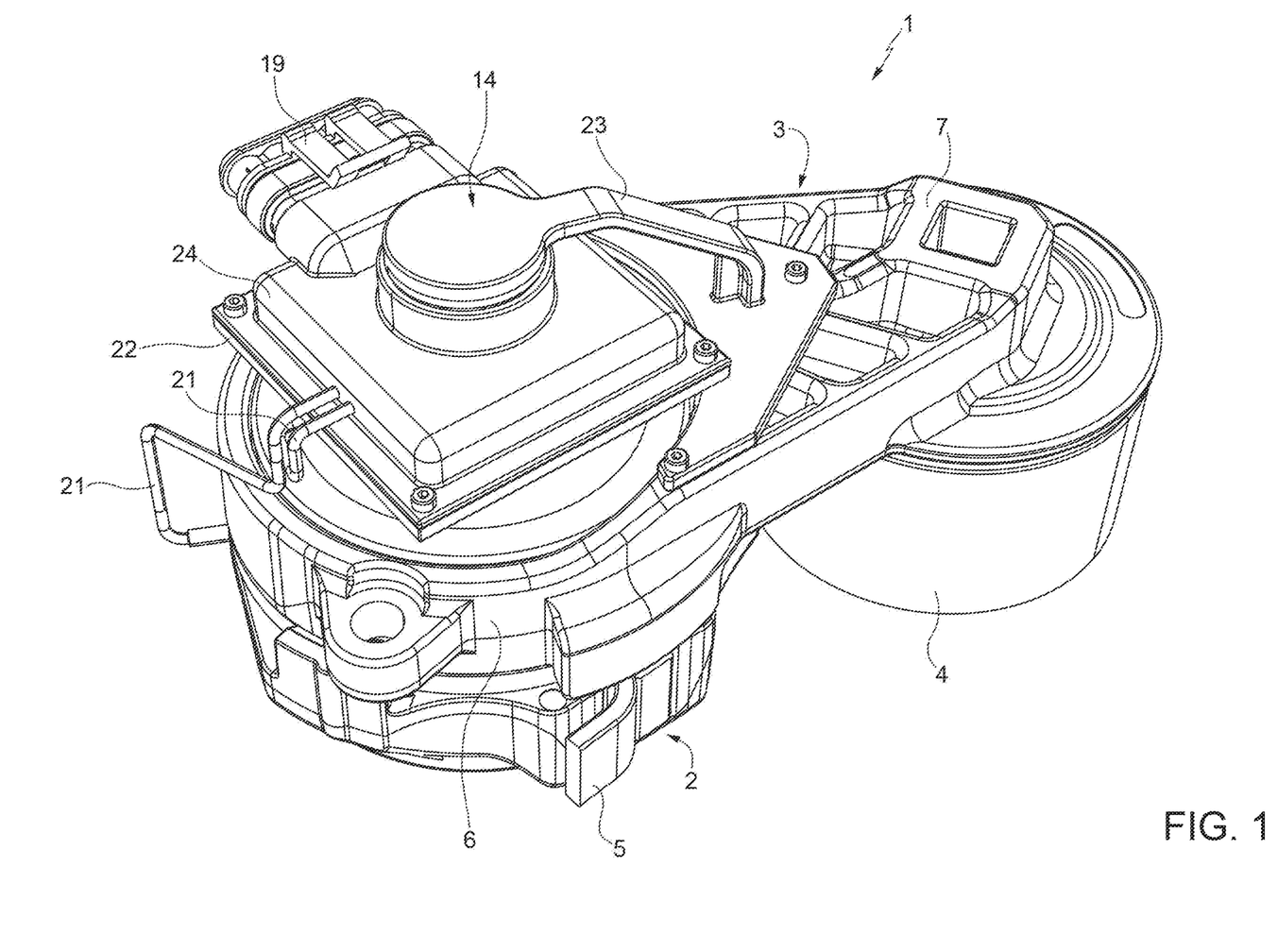
FIG. 1 is a perspective view of a sensorized tensioner according to the invention.
Figure 2:
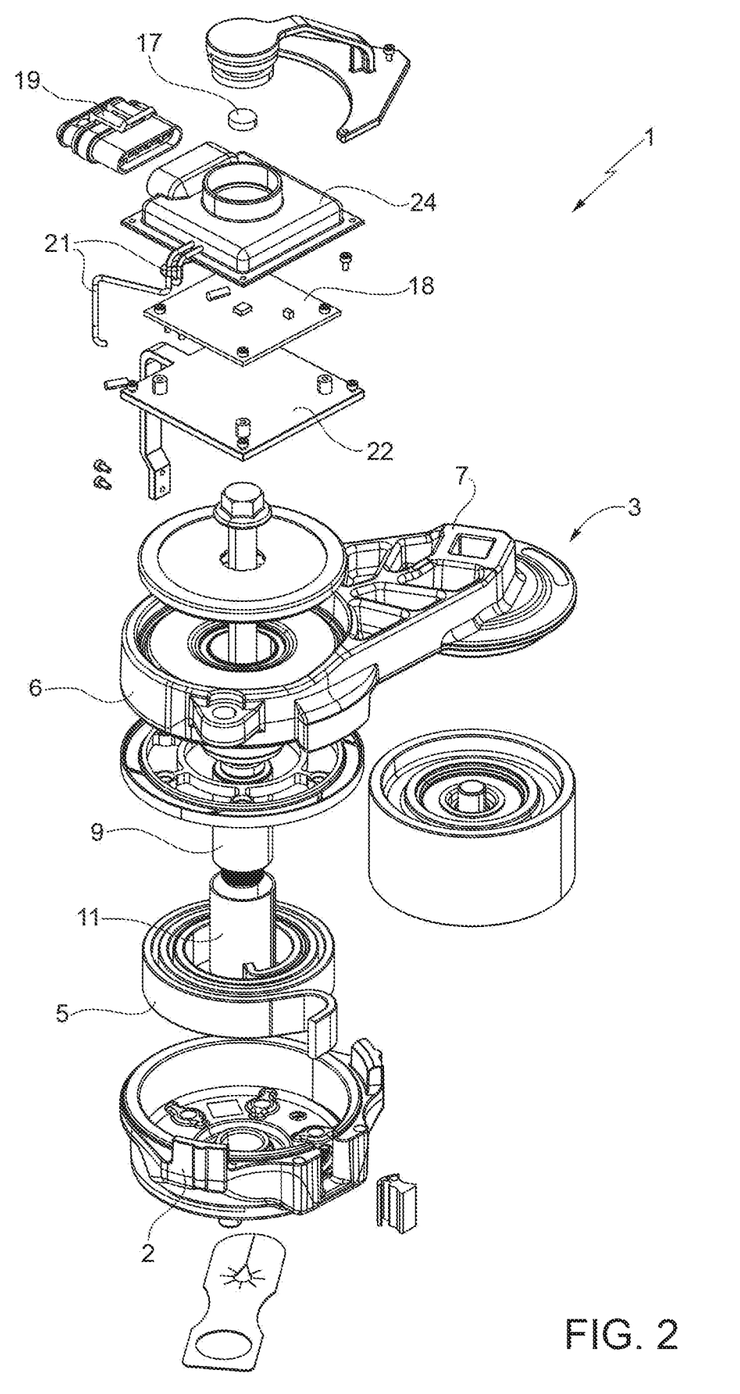
FIG. 2 is an exploded perspective view of the tensioner of FIG. 1.
Figure 3:
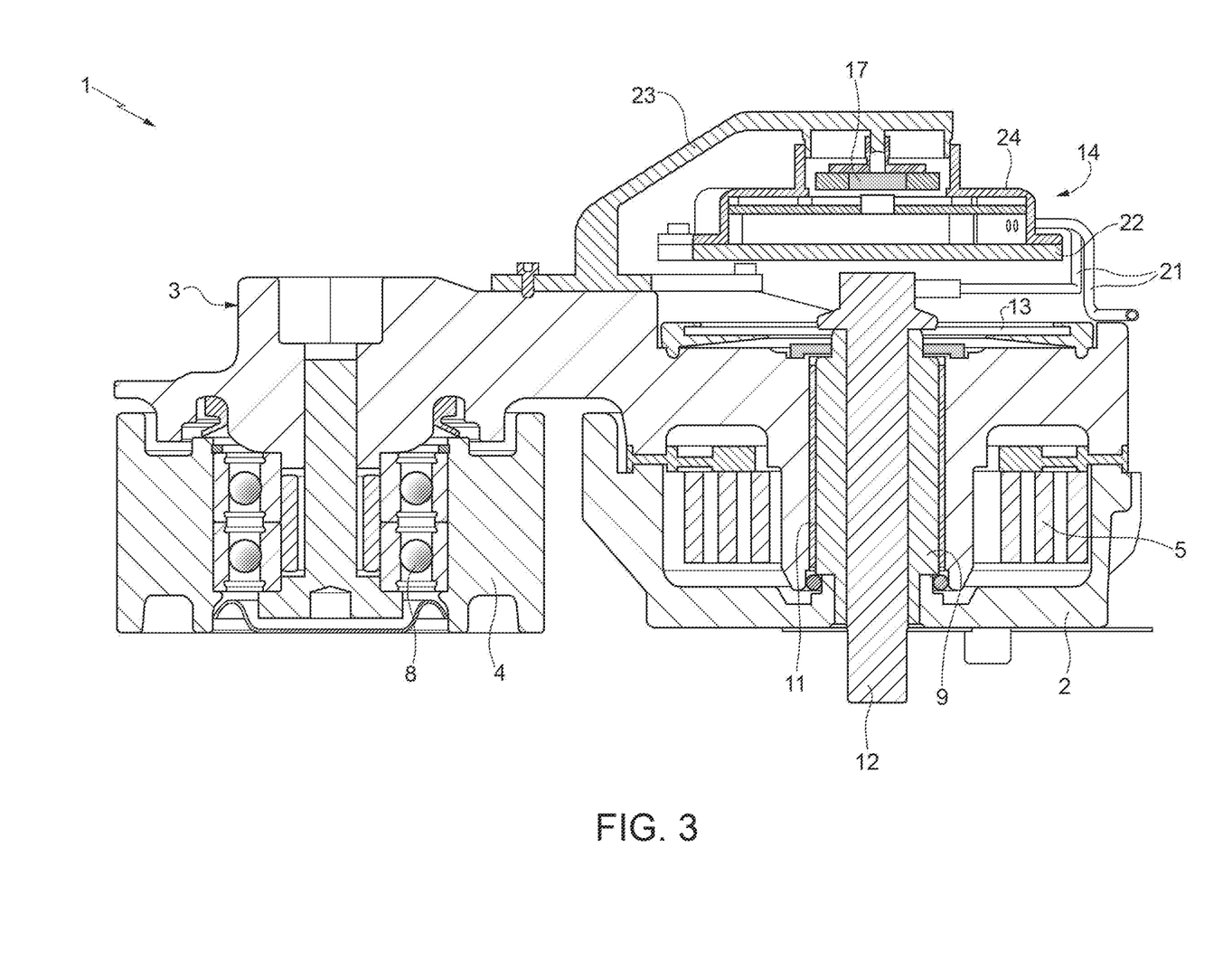
FIG. 3 is a section view of the tensioner of FIG. 1.

With reference to FIGS. 1 to 3, a sensorized tensioner 1 is illustrated comprising a base 2, adapted to be fixed to an engine (not illustrated), an arm 3 and a pulley 4. The arm 3 has an elongated shape and comprises a central body 6 and an end 7 extending distally from the central body 6. The central body 6 is hinged to the base 2 by means of a pin 9 and the end 7 carries a pulley 4 by means of bearings 8. The pulley 4 is configured to cooperate with a belt (not illustrated) of a transmission of the engine.

The tensioner 1 further comprises a spring 5 comprising a first end connected to the body 6 of the arm 3 and to a second end connected to the base 2. The spring 5 is sized so as to provide a predetermined tensioning force to the transmission belt by means of the pulley 4.

The pin 9 is integral with the base 2 and cooperates with a slide bushing 11 coaxial with it and integral with the arm 3. The pin 9 and the arm 3 are axially constrained by means of an elastic element, for example a disc spring 13, preloaded. The tensioner 1 is operatively connected to a base of an internal combustion engine by a screw 12 integral with the pin 9.

Lastly, the tensioner 1 comprises sensor means 14 configured to acquire the value of a plurality of physical quantities relative to some elements of the tensioner 1. Preferably said sensor means 14 comprise a temperature sensor, preferably a thermocouple 16 and a position sensor, preferably a magnet 17.

The tensioner 1 further comprises an electronic unit 20 configured to cooperate with the sensor means 14 in order to collect the values of the physical quantities quantified by the sensor means 14. The electronic unit 20 essentially comprises an electronic circuit 18 configured to cooperate with the temperature sensor and the position sensor and a connector 19 adapted to allow communication of the data collected by the electronic circuit 18 to a control unit of the vehicle (not illustrated).

The electronic circuit 18 may also be configured to process the above-mentioned values and communicate the results to the vehicle control unit according to the method described below in further detail.

The tensioner 1 further comprises a supporting structure 22 having a substantially box-shape and housing inside it the electronic circuit 18. Preferably, the supporting structure 22 is integral with the base 2 and is positioned above the same, namely above the elastic element 13, and is made in two elements, one upper and one lower, which can be opened to house the electronic circuit 18 inside.

The supporting structure 22 comprises, obtained on the upper element, a hole 24 within which a tubular element 25 is housed integrally connected to the arm 3 of the tensioner by means of a flange 23 extending in a cantilever from the distal portion 7 towards the structure 22.

The magnet 17 is conveniently housed inside the tubular element 25, for example it is carried by the bottom surface thereof by means of an interlock coupling. The magnet 17 is configured to interact, by means of the magnetic field it generates, with the electronic circuit 18 in order to identify the position of the arm 3 with respect to the base 2.

The thermocouple 16, in the known art, comprises two metal filaments 21, which connect the electronic circuit 18 to the pin 9 and the bushing 11 respectfully, in order to measure the temperature thereof during use of the tensioner 1. Conveniently the metal filaments 21 pass through the supporting structure 22 and can be conveniently housed in appropriate guides.

The invention further relates to a method for estimation of the state of efficiency of the tensioner 1 by means of the data collected by the sensor means 14.

Figure 4:
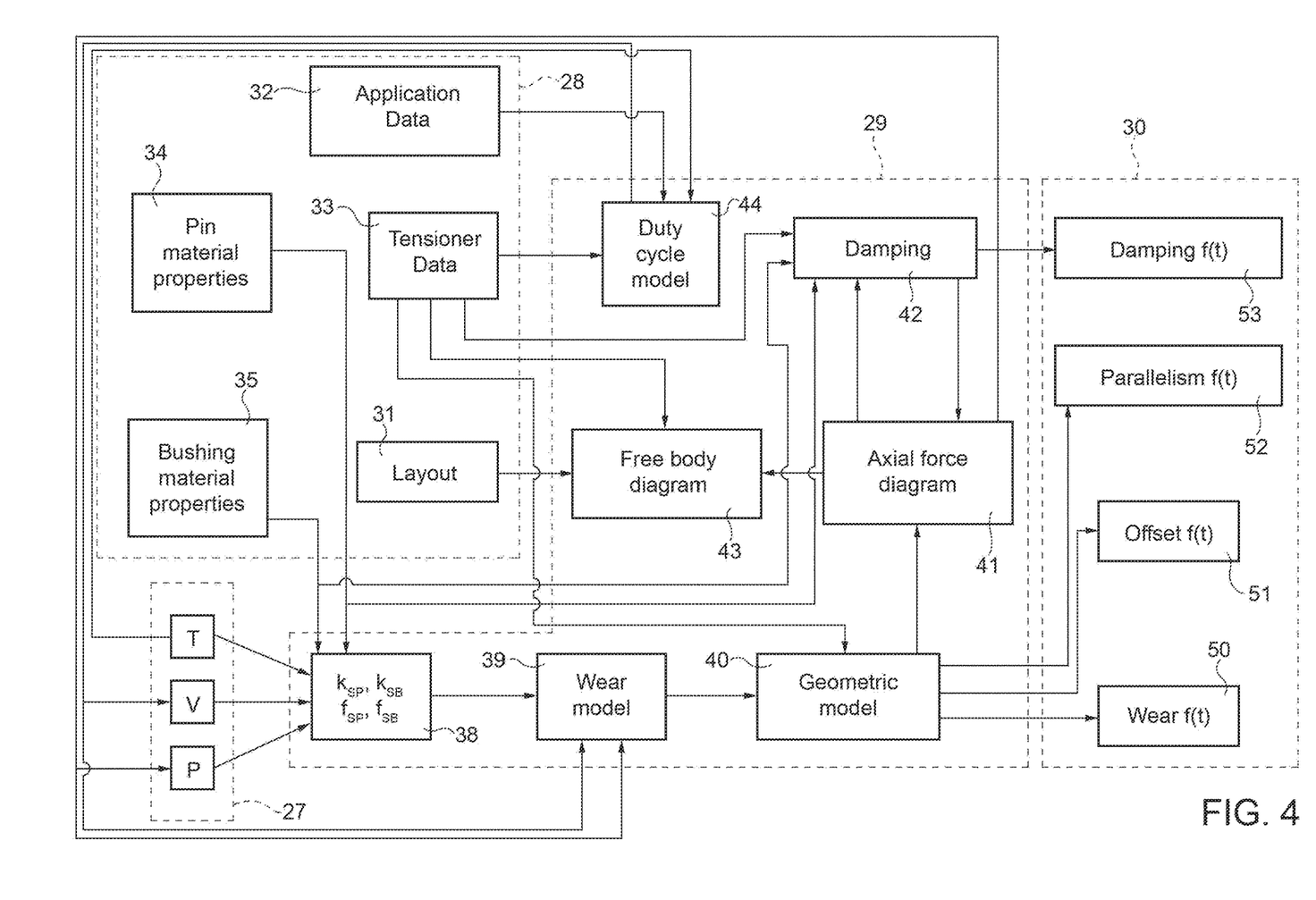
FIG. 4 is a diagram illustrating the operation of a method for estimation of the efficiency of the tensioner of FIG. 1.

Preferably said method is an open-loop control, as illustrated in FIG. 4, said method essentially comprising the steps of:

acquiring data (block 27) relative to operating parameters of the tensioner 1;

calculating a plurality of quantities (block 29) representative of the state of efficiency of the tensioner 1;

comparing the quantities (block 30) with stored threshold values; and activating a signal if the comparison determines a condition of inefficiency of the tensioner 1.

The acquisition of data (block 27) comprises:

the acquisition, via the sensor means 14, of a plurality of quantities relative to operation of the tensioner, such as the temperature T between pin 9 and bushing 11 or the position of the arm 3 (block 32) with respect to the base 2;

the acquisition of data previously stored in the electronic circuit 18 (or the vehicle control unit) such as the properties of the material of the pin 8 or of the bushing 11 (blocks 34, 35), data relative to the arrangement of the tensioner with respect to the belt transmission system (block 31), geometrical data relative to the tensioner itself (block 34);

the acquisition of data coming from other sensors of the vehicle, for example data relative to the application (block 32), such as the r.p.m. of the engine, or the percentage of use of the engine at a predetermined velocity % $\alpha_i$ and at a predetermined engine load.

Calculation of the quantities representative of the state of efficiency of the tensioner 1 (block 29) comprises the steps of:

calculating the friction coefficients $f_{PB}, f_{SB}$ and the wear coefficients $K_{PB}, K_{SB}$ of the pin 9 and the bushing 11 (block 38), by means of the data coming from the blocks 27, 34, 35, stored in appropriate tables or graphs correlating temperature, pressure and velocity and obtained by experimental means;

calculating the wear (block 39) $\delta_{PB}, \delta_{SB}$ of the pin 9 and/or of the bushing 11 using a wear model (for example Reye's hypothesis) by means of the data coming from the blocks 27, 38;

calculating the wear and the parallelism as a function of the time by means of an appropriate geometric model of the tensioner (block 40) receiving in input the data coming from the blocks 33 and 39 and correlating the wear of the bushing 11 with the parallelism. Said calculation of wear and parallelism is made using mathematical relationships deduced from experimental tests;

calculating the axial force acting on the arm 3 by means of an axial force model (block 41) comprising maps of values collected experimentally, receiving in input the data from the block 40 and from a block 42;

calculating the damping of the tensioner 1 by means of a model (block 42) adapted to calculate the damping of the tensioner, substantially by calculating the acting force multiplied by the application arm thereof and the friction coefficient, and receiving in input data from the blocks 33, 34, 35 and 42;

estimating the pressure P acting between pin 9 and bushing 8 by means of an experimental free body diagram model (block 43) of the tensioner receiving in input data from the blocks 41, 31 and 33;

estimating the velocity V of the arm 3 by means of an experimentally processed duty cycle model (block 44). It receives the data from the blocks 32, 33 and the temperature T;

The wear, parallelism and damping values of the tensioner 1 are calculated and updated in real time and are compared with predetermined threshold values (block 30).

Figure 5:
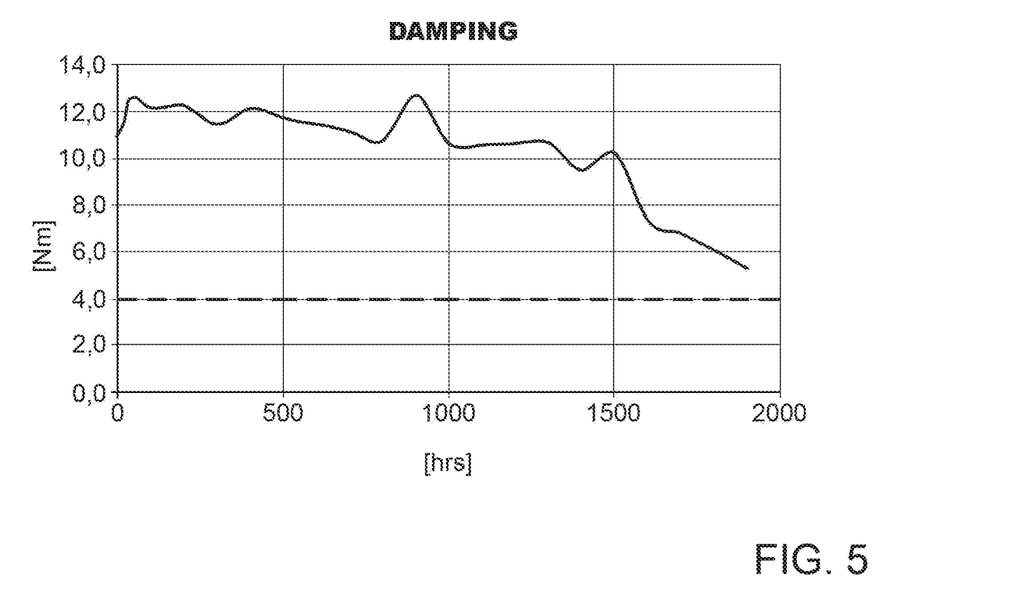
FIGS. 5 and 6 are graphs representing parameters for estimation of the efficiency of the tensioner of FIG. 1 as a function of the time.
Figure 6:
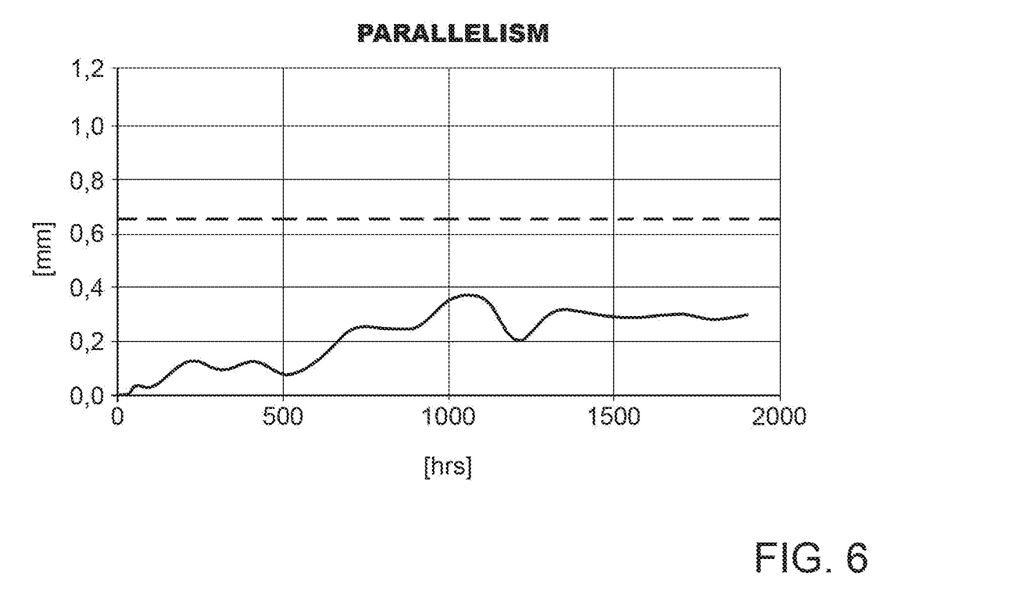

FIGS. 5 and 6 give two examples of comparison in real time of said quantities, damping and parallelism respectively, with pre-set threshold values.

FIG. 5 shows the damping, in Nm, as a function of the time, in hours, and a lower threshold value is provided, $S_{set}$, below which the damping of the tensioner 1 is considered inadequate.

FIG. 6 shows the parallelism, in mm, as a function of the time, in hours, and an upper threshold value, $P_{set}$, is provided above which the parallelism of the tensioner 1 is considered inadequate.

The threshold values can be stored previously on the electronic circuit 18 or in the vehicle control unit.

When the value of the quantity representative of the state of efficiency of the tensioner 1 exceeds an upper and/or lower threshold value, a signal is sent to the vehicle control unit and the state of the tensioner is signalled.

The signalling can be of any known type, for example a light on the dashboard and/or an acoustic alarm.

Preferably prior to said signalling it is also possible to indicate numerically, for example by means of display of the remaining kilometres, the residual life of the tensioner and the signalling will be activated only when a threshold value is exceeded.

Figure 7:
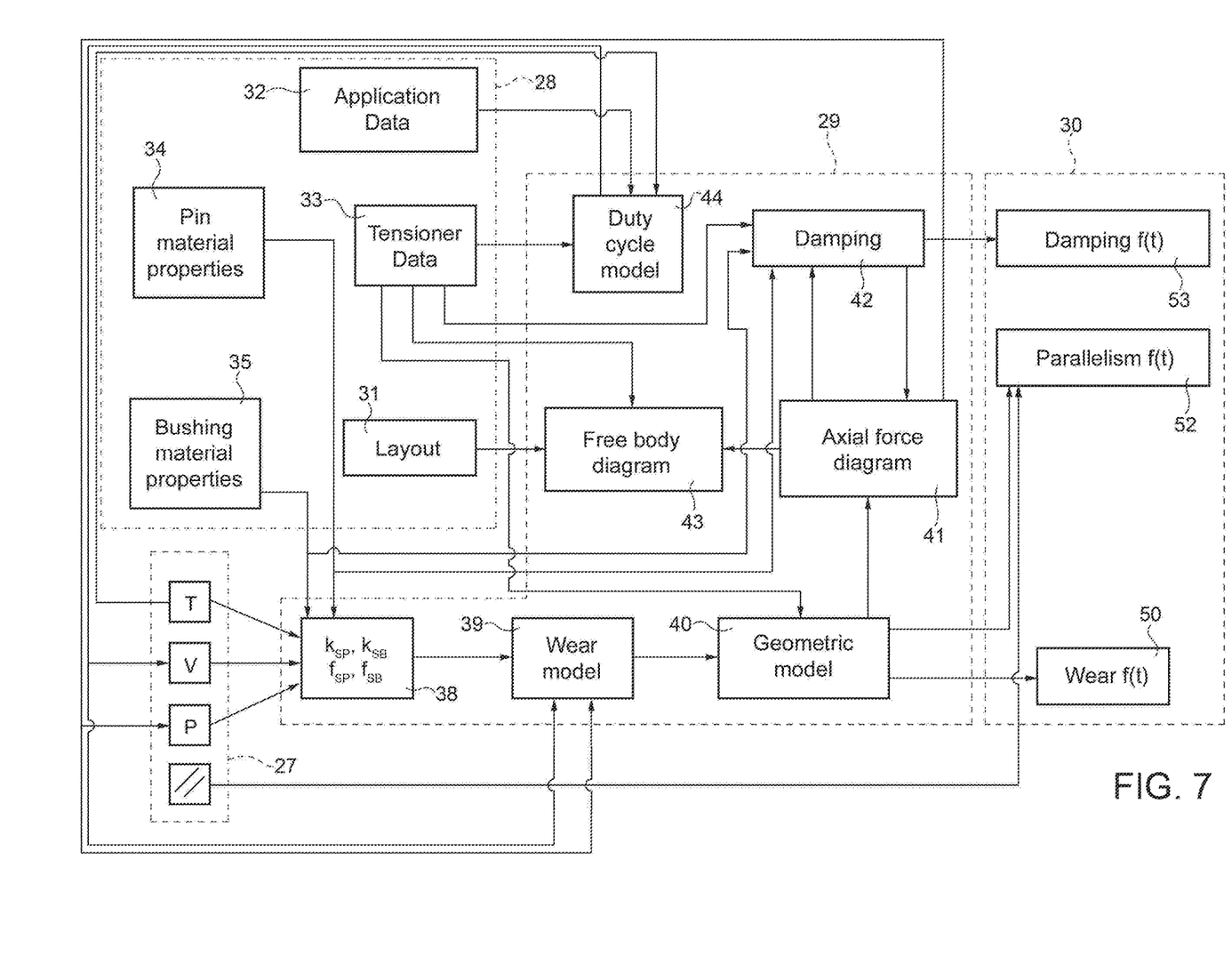
FIG. 7 is a diagram illustrating the operation of a method for estimation of the efficiency of the tensioner of FIG. 1 according to a closed-loop control.

FIG. 7 illustrates a variant of the method of FIG. 4, in which a closed-loop control of the parallelism is present.

In this variation the parallelism is measured directly by means of an appropriate proximity sensor //, not illustrated, carried in a known manner by the tensioner 1.

The closed control by means of the proximity sensor // allows greater precision and therefore improved prediction of the remaining life of the tensioner 1.

From an examination of the characteristics of the tensioner described, the advantages that can be obtained are evident.

The use of a tensioner 1 provided with sensor means 14 configured to acquire data relative to the tensioner 1 allows monitoring of the state of the tensioner 1 in real time and notification to the user of a state of inefficiency of the tensioner 1 if the efficiency values exceed a predetermined threshold.

Lastly, it is clear that modifications or variations that do not depart from the protective scope defined by the claims can be made to the tensioner 1 described and to the relative method for estimation of the efficiency illustrated.

For example, the tensioner 1 could be of any type, for example a dual-arm tensioner.

The models for calculation of the parameters indicating the efficiency of the tensioner 1 described above could be different.

The closed-loop control could be realized not only via the proximity sensor but by means of other sensors.

The invention claimed is:

1. A tensioner comprising:
a base adapted to be secured to an engine,
at least one arm hinged to a pin fixed to said base and bearing a pulley adapted to cooperate with a belt of a transmission of said engine,
elastic means for pushing said at least one arm in a direction so as to keep said pulley against said belt, and sensor means for acquiring in real time a plurality of data relating to said tensioner to estimate the state of efficiency of the same, wherein said sensor means comprise a temperature sensor and a position sensor for measuring the angular position of said arm with respect to said base.

2. The tensioner according to claim 1, wherein said temperature sensor measures a temperature of or near said pin.

3. The tensioner according to claim 1, wherein the temperature sensor is formed by a thermocouple.

4. The tensioner according to claim 1, wherein said position sensor is carried by said base and interacts with an element carried by said at least one arm.

5. The tensioner according to claim 1, comprising an electronic circuit connected to said sensor means and provided with means for processing signals generated by said sensor means, and a connector to connect said electronic circuit to a control unit of said vehicle.

6. The tensioner according to claim 1, comprising a proximity sensor configured to measure the parallelism of said arm of said tensioner.

7. A tensioner comprising:
a base adapted to be secured to an engine,
at least one arm hinged to a pin fixed to said base and bearing a pulley adapted to cooperate with a belt of a transmission of said engine,
elastic means for pushing said at least one arm in a direction so as to keep said pulley against said belt,
sensor means for acquiring in real time a plurality of data relating to said tensioner to estimate the state of efficiency of the same, and
an electronic circuit connected to said sensor means and provided with means for processing signals generated by said sensor means, and a connector to connect said electronic circuit to a control unit of said vehicle.

8. The tensioner according to claim 1, wherein said sensor means comprise a temperature sensor and a position sensor for measuring the angular position of said arm with respect to said base.

9. The tensioner according to claim 8, wherein said temperature sensor measures a temperature of or near said pin.

10. The tensioner according to claim 8, wherein the temperature sensor is formed by a thermocouple.

11. The tensioner according to claim 8, wherein said position sensor is carried by said base and interacts with an element carried by said at least one arm.

12. The tensioner according to claim 7, further comprising a proximity sensor configured to measure the parallelism of said arm of said tensioner.

* * * * *